United States Patent [19]

Sakane et al.

[11] 4,306,807

[45] Dec. 22, 1981

[54] LIGHT MEASURING SYSTEM

[75] Inventors: Toshio Sakane, Kodaira; Tokuichi Tsunekawa, Yokohama, both of Japan

[73] Assignee: Canon Kabushiki Kaisha, Tokyo, Japan

[21] Appl. No.: 44,992

[22] Filed: Jun. 4, 1979

[30] Foreign Application Priority Data

Jun. 12, 1978 [JP] Japan ................................ 53-70517

[51] Int. Cl.³ .......................... G01J 1/00; G01J 1/32; G01J 1/42; G03B 7/00
[52] U.S. Cl. .................................. 356/223; 356/213; 356/218; 354/60 R; 354/60 A
[58] Field of Search ..................... 354/24, 60 R, 60 A; 356/223

[56] References Cited

U.S. PATENT DOCUMENTS 3,820,126  6/1974  Haratake ............................... 354/24
3,863,263  1/1975  Itagaki .................................. 354/24

Primary Examiner—John K. Corbin
Assistant Examiner—Rodney Bovernick
Attorney, Agent, or Firm—Toren, McGeady & Stanger

[57] ABSTRACT

In the disclosed system, a light measuring circuit having a logarithmical amplifier, is constructed to produce pulses at a frequency corresponding to the output of the light measuring circuit. Pulses are counted during a time interval corresponding to the temperature characteristic of the light measuring circuit so as to obtain a count value corresponding to the light input free of the influence of temperature.

11 Claims, 7 Drawing Figures

FIG.1
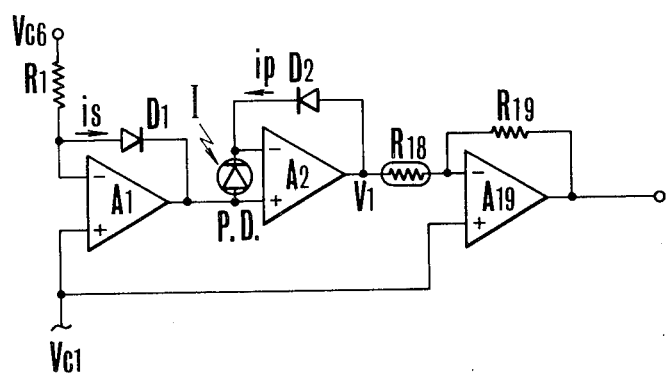
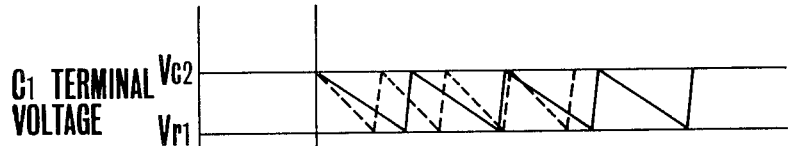
FIG.3a $C_1$ TERMINAL VOLTAGE $V_{C2}$ / $V_{r1}$
FIG.3b $f(T,I)$
FIG.4(a)    FIG.4(b)
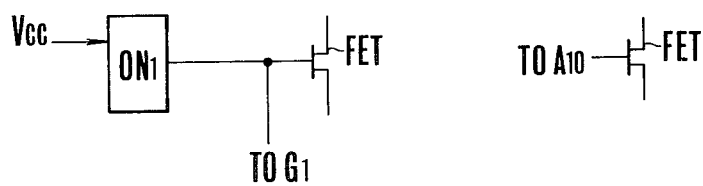

LIGHT MEASURING SYSTEM

FIELD OF THE INVENTION

The present invention relates to a temperature compensation circuit for a light measuring circuit, and particularly, to a compensation circuit composed of a logarithmic amplifier having a light sensing element such as a photo-diode for producing a current proportional to the brightness to be measured and a logarithmical conversion diode for logarithmic compressing the photocurrent produced in the light sensing element and a constant current logarithmically compressing circuit for compensating for the saturated current along the reversed direction of the logarithmical conversion diode in the logarithmical amplifier.

DESCRIPTION OF THE PRIOR ART

A conventional light measuring circuit used, for example, for measuring the brightness of an object to be photographed generally includes a light measuring logarithmic amplifier and a constant-current logarithmically compressing circuit. The logarithmic amplifier is generally composed of an operational amplifier $A_2$ between whose input terminals a light sensing element PD is connected as is shown in FIG. 1 and between one of whose input terminal and whose output terminal a logarithmic conversion diode $D_2$ is connected. The constant current logarithmically compressing circuit is composed of an operational amplifier $A_1$ between whose input terminal and whose output terminal is connected a diode $D_1$. The system is arranged so that the saturated current of the diode $D_1$ is made equal to that of the diode $D_2$ along the reversed direction so as to compensate for the saturated current of diode $D_2$ and so that a voltage $V_1\{=V_{c1}+(KT/q)\cdot\ln(ip/is)\ \ldots\ (1)\}$ corresponding to the measured light I is obtained. The value, ip is a current corresponding to the measured light and of the order of IPA (picoampere) when the brightness is lowest.

Consequently, in the aforementioned conventional circuit the differential $\partial V_1/\partial T$ of the output voltage $V_1$ with reference to the temperature change is equal to $(k/q)\ln(ip/is)$. Hence, only when $ip=is$, $\ln(ip/is)=0$, is the system completely compensated for temperature, while when $ip\neq is$, the compensation becomes necessary. Until now, in order to carry out the temperature compensation a temperature sensitive resistance $R_{18}$ such as thermister was connected to the output terminal of the light measuring circuit as is shown in FIG. 1 so as to compensate for the change of the voltage $V_1$ due to the temperature. However, a temperature sensitive element whose characteristics is linear with reference to the temperature change is essential. Specifically, the accuracy of the characteristics of the temperature sensitive element must be particularly high, an inconvenient requirement in practice.

SUMMARY OF THE INVENTION

In view of the above mentioned inconvenience, it is an object of the present invention to provide the light measuring circuit with a temperature compensating circuit capable of carrying out a temperature compensation with remarkably high accuracy without using the aforementioned temperature sensitive resistance.

A purpose of the present invention is to offer a temperature compensating circuit for a light measuring circuit, in which pulses with a frequency corresponding to the output of the light measuring circuit are produced, and the pulses are counted during the time interval corresponding to the output voltage of a standard voltage source for producing a standard voltage corresponding to the temperature characteristics of the light measuring circuit so as to obtain a count value corresponding to the output of the light measuring circuit free from the influence of the temperature.

Another purpose of the present invention is to offer a temperature compensating circuit for a light measuring circuit, in which pulses with a frequency corresponding to the temperature characteristics of the light measuring circuit are counted during the time interval corresponding to the output of the light measuring circuit so as to obtain a count value corresponding to the output of the light measuring circuit free from the influence of the temperature.

Other purposes of the present invention will be evident from the following detailed description when read in light of the accompanying drawings.

BRIEF DESCRIPTION OF THE DRAWINGS

FIG. 1 is a circuit diagram of the conventional light measuring circuit and the temperature compensation circuit.

FIGS. 3a and 3b are graphs illustrating wave forms for explaining the operation of the embodiment shown in FIG. 2.

FIGS. 4(a) and 4(b) respectively show details of the switch $SW_2$ and $SW_3$ shown in FIG. 2.

DESCRIPTION OF THE PREFERRED EMBODIMENTS

The temperature compensation circuit for the light measuring circuit of the present invention is constructed and operates as follows.

Figure 2:
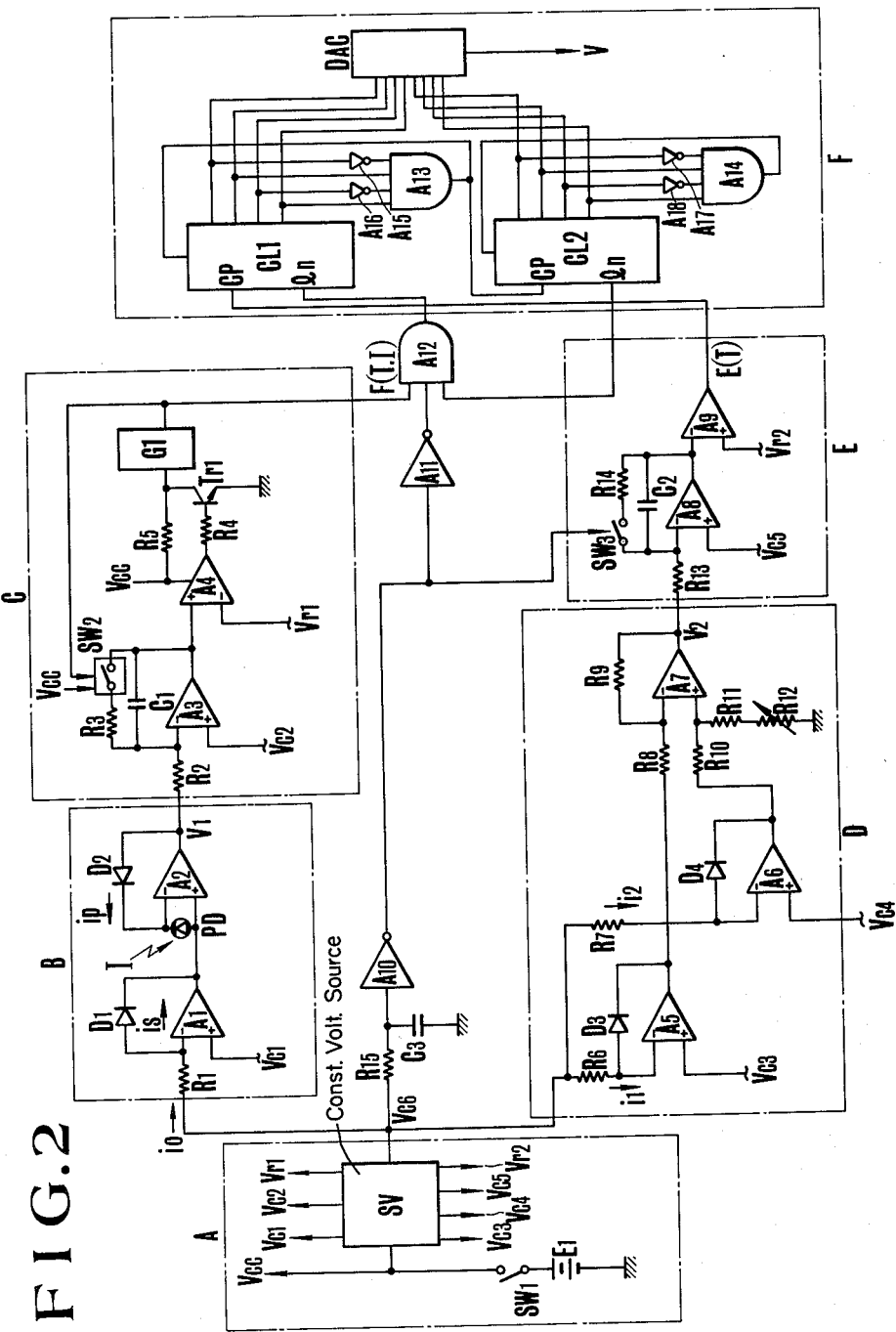
FIG. 2 is a circuit diagram of an embodiment of the temperature compensation circuit for the light measuring circuit of the present invention.

FIG. 2 shows an embodiment of the temperature compensation circuit for the light measuring circuit of the present invention. Here, the circuit A in dot-dash lines is a power source composed of a voltage source $E_1$, a switch $SW_1$ and a constant voltage source SV for supplying constant voltages $V_{c1}-V_{c6}$ and standard voltage $V_{r1}$ and $V_{r2}$. A circuit B in dot-dash lines is a light measuring circuit corresponding to the circuit shown in FIG. 1 produces the aforementioned output voltage $V_1=V_{c1}+(kT/q)\ln(ip/is)$. A circuit C in dot-dash lines is a pulse converting circuit for producing pulses of the frequency corresponding to the output voltage of the light measuring circuit B.

The circuit C includes a condenser or capacitor $C_1$ connected to the feedback circuit of the operational amplifier $A_3$, two resistors $R_2$ and $R_3$ and a switch $SW_2$ to be closed by means of a pulse from a pulse generator $G_1$. These components form an integrating circuit. The switch $SW_2$, which is normally open, is closed instantly when the power source switch $SW_1$ is closed so as to discharge the charge across the capacitor $C_1$ and closed by means of the aforementioned pulse.

In the circuit C, $A_4$ is a comparator to whose inverting input terminal the standard voltage $V_{r1}$ is applied and whose non-inverting input terminal is connected to the output terminal of the integrating circuit. The output of the comparator $A_4$ is connected to the base of a transistor $Tr_1$ by a resistance $R_4$. The transistor $Tr_1$ is intended to control the operation of the pulse generator $G_1$. The latter is, for example, a one shot circuit for producing a pulse with a predetermined width. When the transistor $Tr_1$ is in the opened state a voltage Vcc is applied to the pulse generator $G_1$ which produces a pulse with the predetermined width.

A circuit D in dot-dash lines is constituted of a constant current logarithmically compressing circuit composed of the diodes $D_3$ and $D_4$ and operational amplifiers $A_5$ and $A_6$, and a standard voltage producing circuit composed of a differential amplifier $A_7$ and the resistors $R_6$–$R_{12}$, having the same temperature characteristics as that of the aforementioned light measuring circuit B. The circuit D produces an output voltage $V_2$.

A circuit E in a dotted line is constituted by an integrating circuit composed of a capacitor $C_2$, an operational amplifier $A_8$, a switch $SW_3$ whose operation is controlled by the output of an inverter $A_{10}$, and a standard time signal producing circuit composed of a comparator $A_9$.

A circuit F contains a binary decimal counting circuit of 2 bits composed of binary counters $CL_1$ and $CL_2$, inverters $A_{15}$–$A_{18}$ and AND gates $A_{13}$ and $A_{14}$, and a digital to analog converting circuit DAC for converting the output of the counting circuit into an analog value.

A resistor $R_{15}$ and a capacitor $C_3$ form a delay circuit intended to produce a low level signal through the inverter $A_{10}$, so as to open the switch $SW_3$ when the operation of the light measuring circuit B has been stabilized after the power source switch $SW_1$ is closed. An inverter $A_{11}$ controls an AND gate $A_{12}$ which serves for applying the pulse from the pulse generator $G_1$ to the binary decimal counting circuit.

The operation of the circuit in accordance with the present invention will be best understood by referring to the wave forms shown in FIG. 3. When the power source switch $SW_1$ is closed, the constant voltage $Vc_1$–$Vc_6$ and the standard voltages $Vr_1$ and $Vr_2$ are produced by the constant voltage source SV. Hence, every circuit becomes operative. Thus, the light measuring circuit B produces a voltage $$V_1 = Vc_1 + (kT/q) \ln (ip/is) \qquad (1)$$

in accordance with the measured light in such a manner that the voltage $V_1$ is delivered to the circuit C so as to start to charge the capacitor $C_1$ which was initially reset (i.e., discharged) by the switch $SW_2$. The charging current $i_3$ for the capacitor is represented as follows:

$$i_3 = (V_1 - Vc_2)/R_2 \qquad (2)$$

The time t from which the capacitor $C_1$ starts to charge till the output voltage of the operational amplifier $A_3$ reaches the standard voltage $Vr_1$ is represented as follows:

$$t = \frac{C_1(Vc_2 - Vr_1)}{i_3}$$

Thus, from the relations (1) and (2), t is represented as follows:

$$t = R_2C_1(Vc_2 - Vr_1)/Vc_1 + \frac{kT}{q} \ln(ip/is) - Vc_2.$$

Consequently, after the lapse of the time t from the start of charging of capacitor $C_1$, the comparator $A_4$ is inverted to produce a low level signal so that after the lapse of t the transistor $Tr_1$ is switched off. As a result the pulse generator $G_1$ is triggered so as to produce a pulse by means of which the switch $SW_2$ is closed instantly so as to reset the capacitor $C_1$ and start the charge of the condenser $C_1$. Consequently, at every interval of time t, the pulse generator $G_1$ produces a pulse with the frequency $$f(T,I) = \frac{1}{t} = \left[ \frac{Vc_1 - Vc_2}{C_1R_2} + \frac{1}{C_1R_2} \cdot \frac{kT}{q} \ln \cdot \frac{ip}{is} \right] / [Vc_2 - Vr_1] \qquad (3)$$

Specifically, the terminal voltage of the capacitor $C_1$ changes linearly between $Vc_2$ and $Vr_1$ as is shown in FIG. 3(a) in such a manner that every time the terminal voltage of the condenser $C_1$ reaches the voltage $Vr_1$ a pulse as shown in FIG. 3(b) is produced with the frequency f(T, I) proportional to the temperature.

On the other hand, the circuit D produces an output $V_2$ with the closing of the power source switch $SW_1$. The voltage $V_2$ which is represented by $$(Vc_4 - Vc_3) - (kT/q) \cdot \ln (i_2/i_1) \qquad (4)$$

is applied to the output of the circuit E so as to be integrated by the capacitor $C_2$ therein. The value $Vc_4 > Vc_3$, and $i_2 > i_1$. Logarithmically compressing diodes $D_3$, $D_4$ are a pair of diodes having the same junction area, and are manufactured under the same conditions in order to compensate for the saturated current along the reverse direction through a large temperature change. The values of $i_1$ and $i_2$ are such as can be supplied in a stable state. That is $i_1/i_0$, $i_2/i_0 \gg 1$, namely $i_1$ and $i_2$ are substantially larger than $10^{-14}$ A.

The capacitor $C_3$ integrates the constant voltage $Vc_6$ to be produced from the constant voltage source SV after the power source switch $SW_1$ has been closed. Hence, after the lapse of a time corresponding to the time constant determined by the resistance $R_{15}$ and the capacitor $C_3$ the output voltage of the capacitor $C_3$ reaches the threshold level of the inverter $A_{10}$, which produces a low level signal. Consequently, the switch $SW_3$ is opened in response to the low level signal so that the integrating operation of the afore-mentioned voltage $V_2$ is started by means of the capacitor $C_2$ after the lapse of a predetermined time from the closing of the power source switch $SW_1$. The charge current i of the capacitor $C_2$ is represented by $(Vc_5 - V_2)/R_{13}$, so that the time $\tau(T)$ until the output voltage of the amplifier $A_3$ reaches the standard voltage $Vr_2$ is represented by $$\tau(T) = \frac{C_2(Vr_2 - Vc_5)}{i} = \frac{C_2R_{13}[Vr_2 - Vc_5]}{[Vc_5 - Vc_4 + Vc_3 + kT/q \ln(i_2/i_1)]} \qquad (5)$$

in such a manner that the comparator $A_9$ produces a high level signal during the time $\tau(T)$ inversely proportional to the temperature. Thus, the AND gate $A_{12}$ allows the passage of the pulses with the afore-mentioned frequency F(T, I) during the time $\tau(T)$ in such a manner that the pulses are counted by the counter. Because the inverter $A_{10}$ produces a low level signal, the inverter $A_{11}$ produces a high level signal so that the AND gate $A_{12}$ allows the passage of the pulses with the frequency F(T, I) during the time $\tau(T)$. Consequently, the number $N(T, I)$ of the pulses passing through the AND gate $A_{12}$ is represented with $$f(T, I) \times \tau(T) = \frac{\left[\frac{V_{c1} - V_{c2}}{C_1 R_2} + \frac{1}{C_1 R_2} \cdot \frac{kT}{q} \ln(i_p/i_s)\right]}{\frac{[V_{c2} - V_{r1}]}{C_2 R_{13}[V_{r2} - V_{c5}]}} \left[V_{c5} - V_{c4} + V_{c3} + \frac{kT}{q} \ln(i_2/i_1)\right]$$

Supposing that $V_{c1} = V_{c2}$, $V_{c5} = V_{c4} - V_{c3}$, $V_{c2} > V_{r1}$, $V_{r2} > V_{c5}$, $$N(T, I) = \frac{V_{r2} - V_{c5}}{V_{c2} - V_{r1}} \cdot \frac{C_2 R_{13}}{C_1 R_2} \cdot \frac{\ln(i_p/i_s)}{\ln(i_2/i_1)} = \quad (6)$$

$$\beta \cdot \ln(aI/i_s) = N(T)$$

$$\beta = \frac{V_{r2} - V_{c5}}{V_{c2} - V_{r1}} \cdot \frac{C_2 R_{13}}{C_1 R_2} \cdot \frac{I}{\ln(i_2/i_1)}, \, i_p = aI,$$

where $a$ is the current-brightness conversion coefficient of the photo-diode.

Consequently, the number of pulses passing through the AND gate does not contain any temperature factor and corresponds only to the brightness so that the influence of the temperature change can completely be excluded.

The number of pulses which correspond to the measured light and pass through the AND gate $A_{12}$ is counted by means of the binary decimal counter of two bits composed of the counters $CL_1$ and $CL_2$. Then, the digital value counted by the counter is converted into a voltage V by the digital-analog converter DAC so that the output voltage V of the converter DAC corresponds to the measured light free from the temperature change corresponding to the relation (6). The switch $SW_2$ shown in FIG. 2 is composed of the one shot circuit $ON_1$ and FET as is shown is FIG. 4(a), while the switch $SW_3$ includes the FET as shown in FIG. 4(b).

As explained above in detail the temperature compensating circuit for the light measuring circuit of the present invention is equipped with a pulse converting circuit for producing pulses with a frequency corresponding to the output of the light measuring circuit having a light measuring logarithmical amplifier and a standard voltage forming circuit having the same temperature characteristics as that of the light measuring circuit and producing the standard voltage. During the time interval corresponding to the output of the standard voltage forming circuit the pulses from the pulse converting circuit are counted so as to obtain the digital value corresponding to the measured light free from the influence of the temperature change of the light measuring circuit. This is quite advantageous for the temperature compensation circuit of the light measuring circuit.

Figure 5:
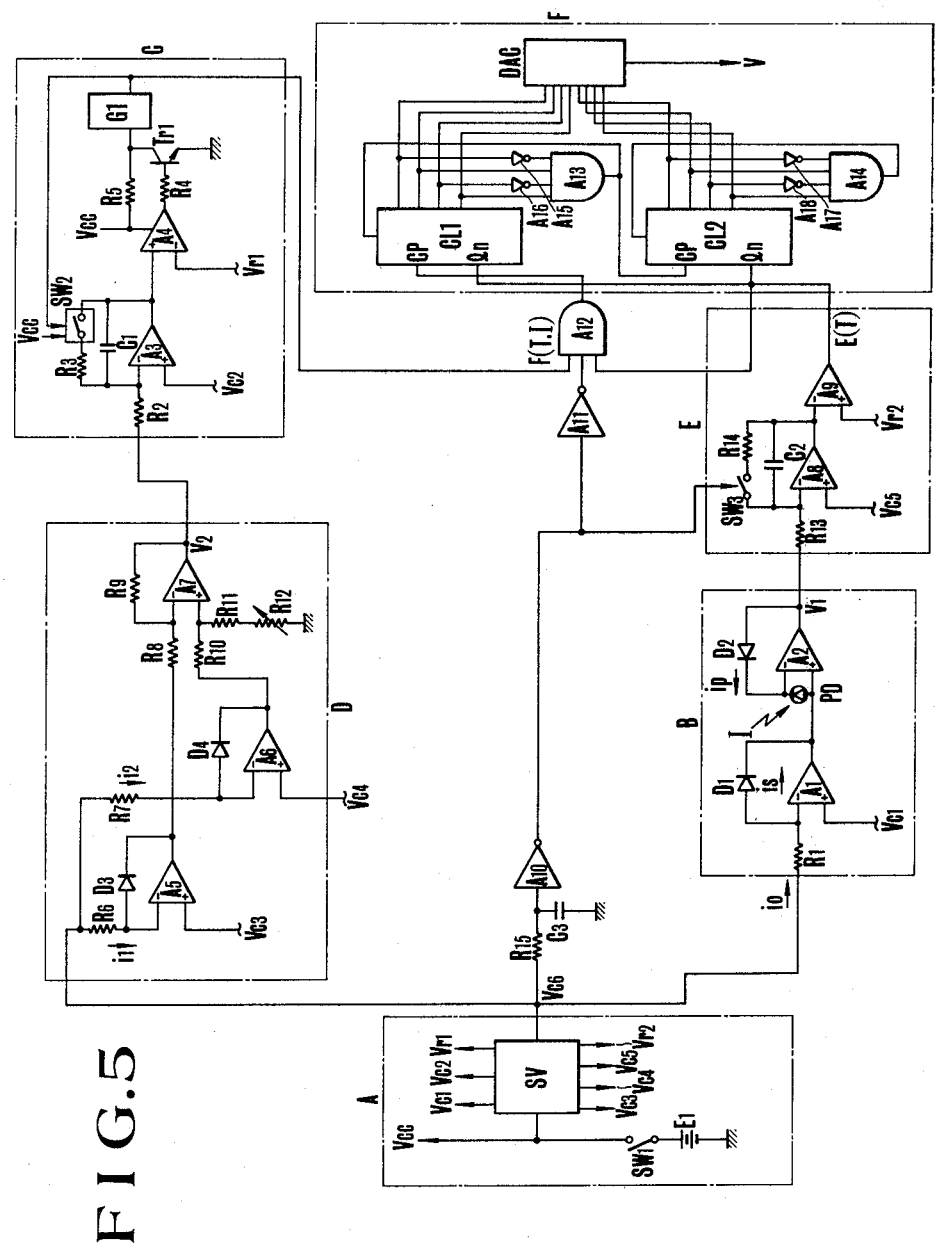
FIG. 5 shows the circuit diagram of another embodiment of the present invention.

Further, in the above mentioned embodiment, the output of the light measuring circuit B is converted into frequency, while the output of the standard voltage forming circuit D is converted into pulses with the time width corresponding to the output, whereby it goes without saying that the same effect can be obtained, when as is shown in FIG. 5 the output terminal of the circuit B is connected to the input terminal of the standard time signal producing circuit E, while the output terminal of the circuit D is connected to the input terminal of the pulse converting circuit C in such a manner that the pulses with the time width corresponding to the output of the circuit B are produced, while the pulses with the frequency corresponding to the output of the circuit D are produced, whereby the pulses are counted.

What is claimed is:

1. A light measuring system comprising:
   (a) a light measuring circuit having given temperature characteristics for producing an output determined by incident light and influenced by temperature,
   (b) a pulse generating circuit for producing pulses with a frequency determined by the output of the light measuring circuit
   (c) a count control circuit having counter means for counting the pulses produced by temperature characteristics corresponding to the pulse generating circuit and control means for actuating the counting of said counter means for a period of time determined by the temperature characteristics of the light measuring circuit, so that the counting of said counter means varies in response to the temperature changes.

2. A light measuring system comprising:
   (a) a light measuring circuit including a light sensing element and a first logarithmic conversion element having given temperature characteristics for logarithmically compressing the output of the light sensing element so as to produce an output responsive to the logarithmic value of the incident light,
   (b) a pulse generating circuit for producing pulses with frequency corresponding to the output of the light measuring circuit,
   (c) a standard voltage forming circuit including a second logarithmic conversion element having the same temperature characteristics as that of the logarithmic conversion element of the light measuring circuit so as to produce a standard voltage corresponding to the temperature characteristics of the first logarithmic conversion element, and
   (d) a counter circuit for counting the pulses from the pulse forming circuit during a time interval depending on the standard voltage and, when the temperature changes, upon the temperature characteristics.

3. A light measuring system in accordance with claim 2, wherein the light measuring, circuit includes an amplifier circuit between whose input terminals the light sensing element is connected and between whose input terminal and whose output terminal a logarithmic conversion element is connected.

4. A light measuring system comprising:
   (a) a light measuring circuit including an amplifier circuit, a light sensing element connected between the input terminals of the amplifier circuit, and a first logarithmic conversion element connected between the input terminal and the output terminal of the amplifier circuit, said logarithmic conversion element having given temperature characteristics,
   (b) a pulse generating circuit for producing pulses with a frequency depending upon the output of the light measuring circuit,
   (c) a standard voltage producing circuit including an amplifier circuit and a second logarithmic conversion element connected between the input terminal and the output terminal of the amplifier circuit, the second logarithmic conversion element having the same temperature characteristics as that of the the first logarithmic conversion element of the light sensing circuit so that said circuit produces an output of the standard voltage depending upon the temperature characteristics of the first conversion element, and (d) a counter circuit for counting the pulses from the pulse forming circuit during a time interval depending upon the standard voltage and, when the temperature changes, upon the temperature characteristics.

5. A light measuring system in accordance with claim 2, wherein the first logarithmic conversion element is a diode.

6. A light measuring system in accordance with claim 1, wherein the measuring circuit includes a logarithmic amplifier.

7. A light measuring system comprising:
a light measuring circuit having given temperature characteristics for producing an output determined by incident light and, when the temperature changes, upon the temperature characteristics,
a pulse forming circuit for producing pulses with a frequency determined by the temperature characteristics of the light measuring circuit, and
(c) a counter circuit for counting the pulses from the pulse forming circuit during a time interval corresponding to the output of the light measuring circuit.

8. A light measuring system comprising:
(a) a light measuring circuit including a light sensing element and a first logarithmic conversion element for logarithmically compressing the output of the light sensing element so as to produce an output depending upon the logarithmic value of the incident light, said first logarithmic conversion element having given temperature characteristics,
(b) a standard voltage forming circuit including a second logarithmic conversion element having the same temperature characteristics as that of the logarithmic conversion element of the light measuring circuit as to produce a standard voltage depending upon the temperature characteristics of the first logarithmic conversion element,
(c) a pulse forming circuit for producing pulses with a frequency determined on the basis of the standard voltage, and
(d) a counter circuit for counting the pulse from the pulse forming circuit during a time interval determined on the basis of the output of the light measuring circuit.

9. A light measuring system comprising:

(a) a light measuring circuit including an amplifier circuit, a light sensing element connected between the input terminals of the amplifier circuit and a first logarithmic conversion element connected between the input terminal and the output terminal of the amplifier circuit, said first logarithmic conversion element having given temperature characteristics,
(b) a standard voltage producing circuit including an amplifier circuit and a second logarithmic conversion element connected between the input terminal and the output terminal of the amplifier circuit, the second logarithmic conversion element having the same temperature characteristics as the first logarithmic conversion element of the light sensing circuit so that said standard voltage producing circuit produces an output of the standard voltage corresponding to the temperature characteristics at the first logarithmic conversion element,
(c) a pulse forming circuit for producing pulses with a frequency determined on the basis of the standard voltage, and
(d) a counter circuit for counting the pulses from the pulse forming circuit during a time interval determined on the basis of the output of the light measuring circuit.

10. A light measuring system comprising:
(a) a light measuring circuit having given temperature characteristics for producing an output responsive to incident light and varying in response to temperature temperature changes on the basis of the temperature characteristics;
(b) a pulse generating circuit for producing pulses with a frequency proportional to the output of the light measuring circuit; and
(c) a count control circuit for counting pulses produced by the pulse generating circuit during a time interval proportional to the temperature characteristics.

11. A light measuring system comprising:
(a) a light measuring circuit having given temperature characteristics for producing an output responsive to incident light and in response to temperature changes on the basis of the temperature characteristics;
(b) a pulse generating circuit for producing pulses with a frequency proportional to the temperature characteristics; and
(c) a counter circuit for counting the pulses from the pulse generating circuit during a time interval proportional to the output of the light measuring circuit.

* * * * *